United States Patent
Tseng

(10) Patent No.: US 9,942,004 B2
(45) Date of Patent: Apr. 10, 2018

(54) APPARATUS AND METHODS FOR MAXIMUM LIKELIHOOD SYMBOL DETECTION IN COMMUNICATIONS SYSTEMS

(71) Applicant: Ching-Yih Tseng, Milpitas, CA (US)

(72) Inventor: Ching-Yih Tseng, Milpitas, CA (US)

( * ) Notice: Subject to any disclaimer, the term of this patent is extended or adjusted under 35 U.S.C. 154(b) by 0 days.

(21) Appl. No.: 15/179,981

(22) Filed: Jun. 11, 2016

(65) Prior Publication Data

US 2016/0365949 A1 Dec. 15, 2016

Related U.S. Application Data

(60) Provisional application No. 62/175,451, filed on Jun. 15, 2015.

(51) Int. Cl.
*H04L 5/12* (2006.01)
*H04L 1/00* (2006.01)

(52) U.S. Cl.
CPC .................. *H04L 1/0054* (2013.01)

(58) Field of Classification Search
CPC ..................................... H04L 1/0054
USPC .......................................... 375/262
See application file for complete search history.

(56) References Cited

U.S. PATENT DOCUMENTS

2003/0099308 A1* 5/2003 Cao ...................... H04L 25/0204
375/340
2007/0286063 A1* 12/2007 Aulin ................ H04L 25/03203
370/203

* cited by examiner

*Primary Examiner* — Helene Tayong
(74) *Attorney, Agent, or Firm* — JCIPRNET

(57) ABSTRACT

This invention discloses apparatus and methods for detecting transmit symbols from the receiving waveform samples at the receiver side for communications systems. The receiving waveform samples are corrupted by channel and noise effects and the detection is carried out with a maximum likelihood optimality criterion. This invention utilizes a successive linear constraint exchange scheme that formulates a sequence of linearly constrained minimization subproblems to allow the solutions to these subproblems, combined with certain quantization and mapping operations, to converge to the optimal maximum likelihood estimate. This invention is applicable to any digitally modulated communications systems, including but not limited to Multiple Input Multiple Output (MIMO) communications systems.

14 Claims, 9 Drawing Sheets

APPARATUS AND METHODS FOR MAXIMUM LIKELIHOOD SYMBOL DETECTION IN COMMUNICATIONS SYSTEMS

This application claims the benefit of U.S. Provisional Application No. 62/175,451, filed on Jun. 15, 2015.

FIELD OF THE INVENTION

The present invention relates to apparatus and methods for detecting transmit symbols at the receiver side in a communications system. This invention detects the symbols optimally with a maximum likelihood criterion and is applicable to any digitally modulated communications systems, including but not limited to Multiple Input Multiple Output (MIMO) communications systems.

BACKGROUND OF THE INVENTION

For a digital modulation communications system, the transmitter encodes information bits into transmit symbols, usually with forward error correction coding, and further modulates the transmit symbols into waveform to travel through the physical media (or channel) of the communication link to arrive at the receiver side. The receiver samples the incoming waveform and employs various digital receiver schemes to recover the information bits from the receiving waveform under channel and noise effects.

One of the challenging tasks for implementing a robust receiver lies in the design of a symbol detector to optimally detect the transmit symbols with a maximum likelihood criterion. The design of a maximum likelihood symbol detector is particularly challenging for a MIMO communications system since it involves multi-dimensional search with an exponential growth complexity when the number of input and/or output increases. This invention discloses apparatus and methods to perform optimal maximum likelihood symbol detector that is applicable to any digitally modulated communications systems, including but not limited to MIMO communications systems.

SUMMARY OF THE INVENTION

This invention presents apparatus and methods to compute for the transmit symbols from the observed receiving digital samples corrupted by channel and noise effects. In particular, the N receiving samples $\{y_1, y_2, \ldots, y_N\}$ and the M transmit symbols $\{x_1, x_2, \ldots, x_M\}$ at one symbol period are related in the following vector form:

$$y = Hx + n$$

where the N×1 vector $$y = \begin{bmatrix} y_1 \\ y_2 \\ \vdots \\ y_N \end{bmatrix}$$

denotes the N receiving samples, the M×1 vector $$x = \begin{bmatrix} x_1 \\ x_2 \\ \vdots \\ x_M \end{bmatrix}$$

denotes the M transmit symbols, the N×M matrix $$H = \begin{bmatrix} h_{11} & \cdots & h_{1M} \\ \vdots & \ddots & \vdots \\ h_{N1} & \cdots & h_{NM} \end{bmatrix}$$

denotes the channel state information and the N×1 vector $$n = \begin{bmatrix} n_1 \\ n_2 \\ \vdots \\ n_N \end{bmatrix}$$

denotes the receiver additive noise. For generality, all these vectors and matrices are assumed complex-valued.

In a typical communications system, each transmit symbol is selected from a pre-designated set of complex-valued, discrete points, termed the symbol constellation. For example, the Quadrature and Amplitude Modulation (QAM) defines transmit symbols from a rectangular grid where QAM-16 modulation contains 16 constellation points, QAM-64 contains 64 constellation points, so on and so forth. This invention uses the notation, $\Omega$, to denote the set of the constellation points in an underlining communications system.

Given the receiving sample vector y and a proper estimation of the channel state information matrix H through training sequences, the maximum likelihood symbol detector is designed to search for the transmit symbol vector x over all possible constellation points, and the corresponding optimization problem is defined as:

$$\min_{\{x_m \in \Omega, m=1,2,\ldots,M\}} \|y - Hx\|_2^2$$

where $\|\bullet\|_2$ denotes the 2-norm of the enclosed operand. As each element of the symbol vector x is constrained to be selected from discrete points on the symbol constellation map, the solution to this maximum likelihood detector is non-trivial, especially when M is large.

The respective least-squares problem can be defined by removing the requirement for the elements of x to be discrete points on the symbol constellation map:

$$\min_{\{x_m, m=1,2,\ldots,M\}} \|y - Hx\|_2^2$$

For this least-squares problem, the optimal solution is well-known and has a closed-form expression as:

$$x_{ls} = (H^\dagger H)^{-1} H^\dagger y$$

where $H^\dagger$ denotes the Hermitian transpose of H. Without loss of generality, the matrix $H^\dagger H$ is assumed invertible and well-conditioned in this invention as the use of "diagonal loading" technique by adding a small positive number to the diagonal elements of $H^\dagger H$ can be practically applied to precondition the $H^\dagger H$ matrix to avoid ill-conditioned issue.

The simplest approximation to the maximum likelihood solution is to "quantize" each element of $x_{ls}$ to the nearest (measured by Euclidean distance) discrete points on the symbol constellation map:

$$\hat{x}_{ls} = Q[x_{ls}]$$

where Q[•] denotes the element-wise quantization of the enclosed vector to the nearest constellation point. When M>1, the "quantized" least-squares solution, $\hat{x}_{ls}$, rarely provides a satisfactory solution compared to the true maximum likelihood optimal solution for detecting the transmit symbols from the receiving samples corrupted by the channel and noise effect. Hence, there is a practical need to design a true maximum likelihood optimized symbol detector in a communications system, and this task is non-trivial, especially for a MIMO communications system.

This invention reformulates the maximum likelihood problem by including the unquantized least-squares solution $x_{ls}$ to the minimization objective function as:

$$\min_{\{x_m \in \Omega, m=1,2,\ldots,M\}} \left\{ \|y - Hx_{ls}\|_2^2 + \|H(x - x_{ls})\|_2^2 \right\}$$

which can be derived by use of the following property for the least-squares solution:

$$H^\dagger(y - Hx_{ls}) = 0$$

Note that the first term in the above reformulated maximum likelihood problem is a constant with respect to the symbol vector x and can be removed from the minimization objective function. Hence, the maximum likelihood problem can be further reformulated as:

$$\min_{\{x_m \in \Omega, m=1,2,\ldots,M\}} \|H(x - x_{ls})\|_2^2$$

Let C be an arbitrary M×M unitary matrix, the maximum likelihood problem can now be readily transformed into a linearly constrained minimization problem:

$$\min_w \|Aw\|_2^2$$

subject to M linear constraints given by:

$$C^\dagger w = f$$

where $$A = HC^\dagger$$

$$f = x - x_{ls}$$

and the M elements of the symbol vector x belong to the discrete constellation points:

$$\{x_m \in \Omega, m=1,2,\ldots,M\}$$

Note that the transmit symbol vector x and the least-squares solution $x_{ls}$ now appears in the form of the constraint values f in the linear constraint specification for this reformulated maximum likelihood problem. In this invention, the choice of the constraint matrix C is not unique and is only required to be unitary, i.e., $C^\dagger = C^{-1}$. Some practically useful choices of the constraint matrix C can be as simple as the identify matrix, I, or an unitary matrix derived from the Singular Value Decomposition (SVD) of H or the QR decomposition of $H^\dagger$:

$$A = \begin{cases} H, & C = I, & H = HI \\ S, & C = V^\dagger, & H = USV^\dagger, \\ R^\dagger, & C = Q^\dagger, & H^\dagger = QR \end{cases}$$

The above linear constraint formulation defines a full set of M linear constraints over the M-dimensional space with the corresponding constraint values specified by the differences of the transmit symbol vector x and the least-squares solution $x_{ls}$, denoted by the vector f. Under this linear constraint minimization framework, this invention utilizes a successive linear constraint exchange scheme that formulates a sequence of linearly constrained minimization subproblems by selecting a reduced set of linear constraints from the full set of M constraints and by assigning proper constraint values to these selected constraints to allow the solutions to these subproblems, combined with certain quantization and mapping operations, to converge to the optimal maximum likelihood estimate of the transmit symbol vector x at the receiver side. Specifically, the core computational unit for this invention includes closed-form computation of solutions to linearly-constrained minimization subproblems, quantization of these subproblem solutions to the nearest constellation points and mapping of the quantized subproblem solutions to their respective neighboring symbol vectors confined to the pivoting property delineated in this invention.

DETAILED DESCRIPTION OF THE PREFERRED EMBODIMENT

Figure 1:
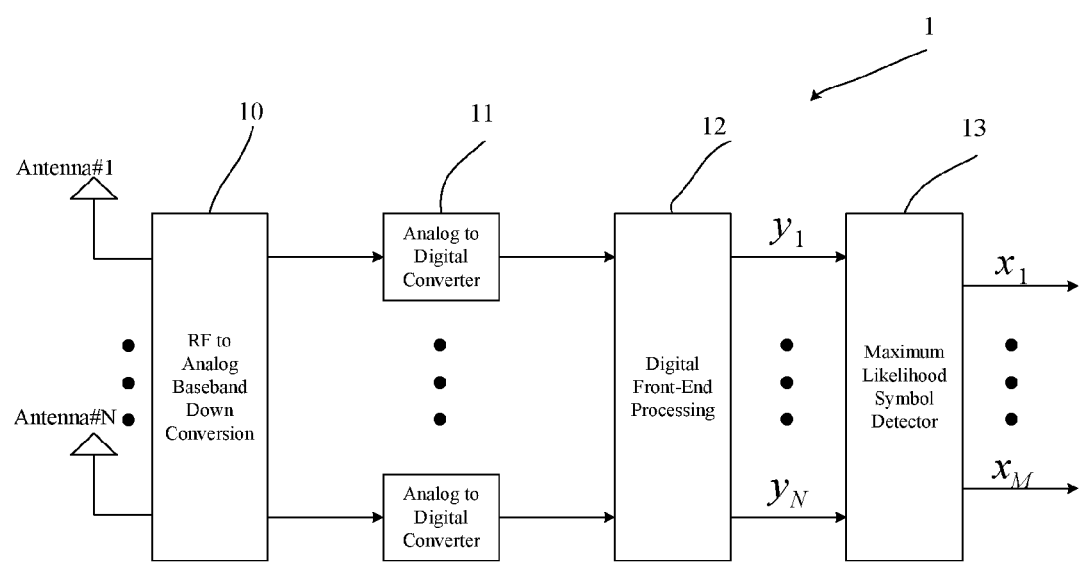
FIG. 1 illustrates the maximum likelihood symbol detector in a MIMO communications system.

A shown in FIG. 1, the receiver of a MIMO wireless communications system 1 with N antennas consists of a Radio Frequency (RF) to Analog Baseband Down Conversion block 10 to convert the N antenna output from RF to N analog baseband signals; N Analog-to-Digital Converters 11 to sample the N baseband analog signals into N streams of digital samples; a Digital Front-End Processing block 12 to perform digital baseband signal front-end processing such as automatic gain control, carrier and timing synchronization, etc.; and a Maximum Likelihood Symbol Detector 13 to estimate the M transmit symbols $\{x_1, x_2, \ldots, x_m\}$ from the N digital samples $\{y_1, y_2, \ldots, y_N\}$ at every symbol period of the communications system. This invention discloses apparatus and methods to implement the maximum likelihood symbol detector 13 that is applicable but not limited to the MIMO communications system 1.

This invention partitions the M-dimensional symbol vector x into two distinct i-dimensional symbol vector, $x_{I_i}$, and (M−i)-dimensional symbol vector, $x_{I_{M-i}}$, specified by the selection of two sets of mutually exclusive indices, $I_i$ and $I_{M-i}$:

$$x_{I_i} = x(I_i), \ x_{I_{M-i}} = x(I_{M-i})$$

$$I_i \cup I_{M-i} = \{1, 2, \ldots, M\}$$

$$I_i \cap I_{M-i} = \varnothing$$

where $I_i$ contains i indices and $I_{M-i}$ contains (M−i) indices with i selected as an integer between 1 and M. The order of the indices in these two index sets has no significance in deriving the maximum likelihood detector and can be assumed in ascending order without loss of generality. For example, for M=8 and i=3 and the M-dimensional symbol vector given by:

$$x = \begin{bmatrix} x_1 \\ x_2 \\ x_3 \\ x_4 \\ x_5 \\ x_6 \\ x_7 \\ x_8 \end{bmatrix}$$

When the two mutually exclusive index sets are chosen as $I_i = \{1, 3, 5\}$ and $I_{M-i} = \{2, 4, 6, 7, 8\}$, the two reduced dimensional symbol vectors are given by:

$$x_{I_i} = \begin{bmatrix} x_1 \\ x_3 \\ x_5 \end{bmatrix}, \ x_{I_{M-i}} = \begin{bmatrix} x_2 \\ x_4 \\ x_6 \\ x_7 \\ x_8 \end{bmatrix}$$

With this partition, this invention establishes a procedure to construct an M-dimensional symbol vector x from a given i-dimensional symbol vector $x_{I_i}$ by solving a linearly-constrained minimization problem with i linear constraints and quantizing the solution to the nearest constellation points to generate the (M−i)-dimensional symbol vector $x_{I_{M-i}}$, and then concatenating $x_{I_i}$ and $x_{I_{M-i}}$ together to form x. The i-dimensional symbol vector $x_{I_i}$ used as the input in this generation procedure is termed the seed symbol vector, the induced (M−i)-dimensional symbol vector $x_{I_{M-i}}$ is termed the seed complementary symbol vector and the output M-dimensional symbol vector x is term the augmented symbol vector. In particular, the linearly-constrained minimization problem is defined as:

$$\min_w w^\dagger A^\dagger A w$$

subject to i linear constraints on w, given by:

$$C_{I_i}^\dagger w = x_{I_i} - x_{ls, I_i}$$

where $$C_{I_i} = C(:, I_i)$$

consists of the i columns of C indexed by $I_i$ and $$x_{ls, I_i} = x_{ls}(I_i)$$

contains the i elements of $x_{ls}$ indexed by $I_i$. Note that the matrix C and vector $x_{ls}$ are the constraint matrix and least-squares solution as defined in the SUMMARY OF THE INVENTION Section of this manuscript of the invention.

Figure 2:
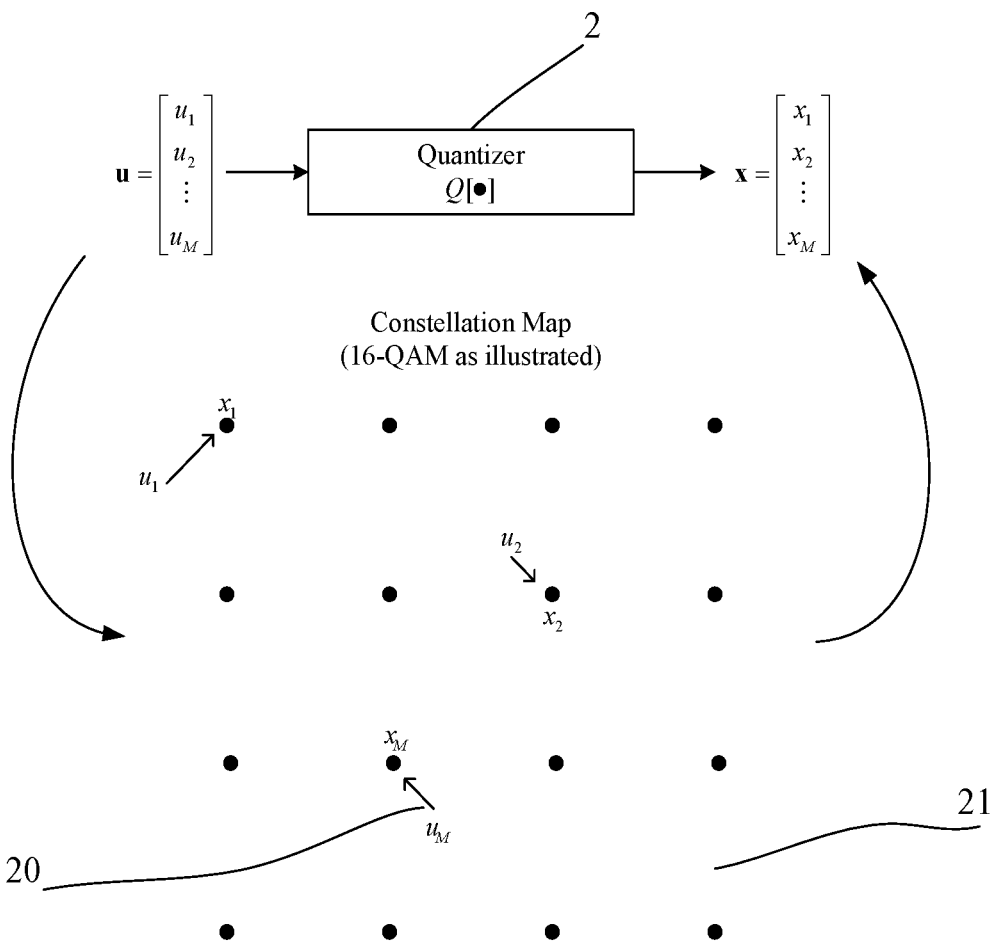
FIG. 2 illustrates the quantization of an M-dimensional complex-valued vector u to an M-dimensional symbol vector x having elements specified by a symbol constellation map.

A closed-form solution for the optimal w to this linearly-constrained minimization problem is well-known and given by:

$$w_{I_i} = C_{I_i} f_{I_i} - C_{I_{M-i}} (C_{I_{M-i}}^\dagger A^\dagger A C_{I_{M-i}})^{-1} C_{I_{M-i}}^\dagger A^\dagger A C_{I_i} f_{I_i}$$

where $$f_{I_i} = x_{I_i} - x_{ls, I_i}$$

and $$C_{I_{M-i}} = C(:, I_{M-i})$$

contains the (M−i) columns of C indexed by $I_{M-i}$. Define the vector $u_{I_{M-i}}$ as:

$$u_{I_{M-i}} = C_{I_{M-i}}^\dagger w_{I_i} + x_{ls, I_{M-i}} = -(C_{I_{M-i}}^\dagger A^\dagger A C_{I_{M-i}})^{-1} C_{I_{M-i}}^\dagger A^\dagger A C_{I_i} f_{I_i} + x_{ls, I_{M-i}}$$

where $$x_{ls, I_{M-i}} = x_{ls}(I_{M-i})$$

contains the (M−i) elements of $x_{ls}$ indexed by $I_{M-i}$. The (M−i)-dimensional symbol vector $x_{I_{M-i}}$ is generated by quantizing $u_{I_{M-i}}$ element-wise to the nearest constellation points:

$$x_{I_{M-i}} = Q[u_{I_{M-i}}]$$

where the quantizer Q[•] 2 denotes the quantization of each element of the enclosed vector to the nearest constellation point 20 with a pre-defined constellation map 21 as illustrated in FIG. 2.

Figure 3:
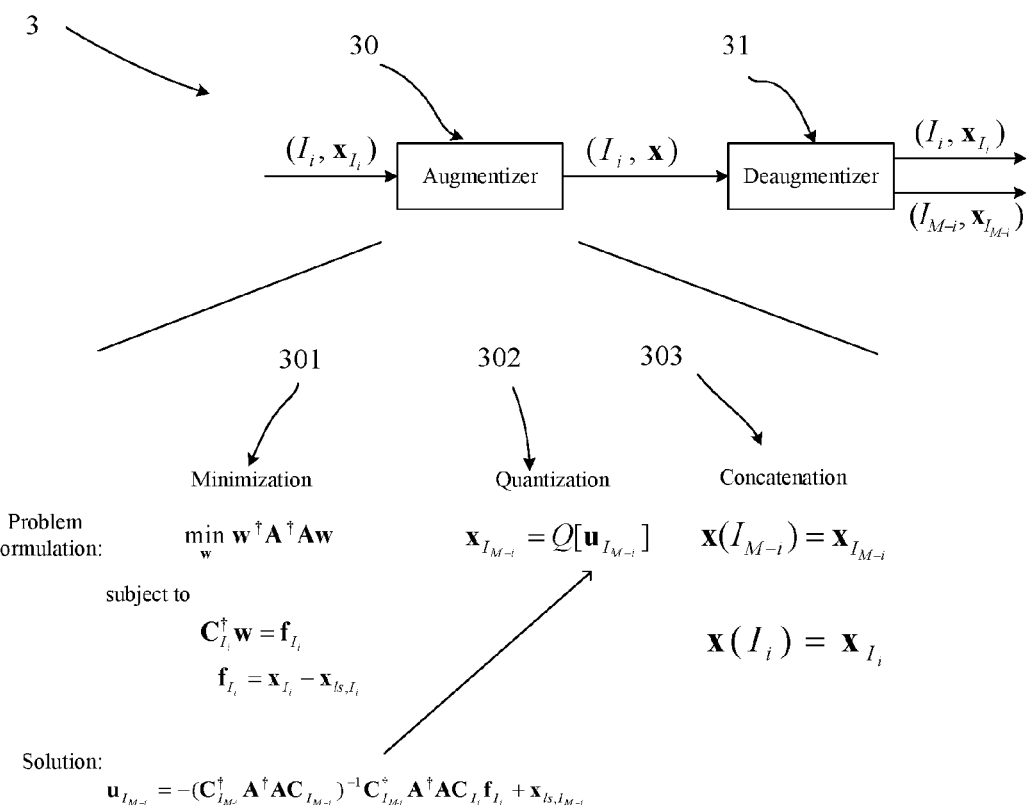
FIG. 3 illustrates the augmentation process (augmentizer) for mapping an i-dimensional seed symbol vector $x_{I_i}$ into an M-dimensional augmented symbol vector x, and the deaugmentation process (deaugmentizer) for mapping the M-dimensional augmented symbol vector x back to the i-dimensional seed symbol vector $x_{I_i}$ and the (M−i)-dimensional seed complementary symbol vector $x_{\bar{I}_{m-i}}$.

Note that when computing $C_{I_{M-i}}^\dagger w_{I_i}$ in the above derivation the unitary property of the C matrix is applied, i.e., $C_{I_{M-i}}^\dagger C_{I_i} = 0$ and $C_{I_{M-i}}^\dagger C_{I_{M-i}} = I$. As illustrated in FIG. 3, this procedure of generating the M-dimensional augmented symbol vector x from the i-dimensional seed symbol vector $x_{I_i}$ is referred to as the augmentation process in the description of this invention and is represented by a block termed the augmentizer 30 which consists of the minimization 301, quantization 302 and concatenation 303 steps; The reverse process of generating $x_{I_i}$ and $x_{I_{M-i}}$ back from $(I_i, x)$ is referred to as the deaugmentation process and is represented by a block termed the deaugmentizer 31 as illustrated in FIG. 3. Note that the augmented symbol vector x is uniquely determined by $(I_i, x_{I_i})$, $(A, C, x_{ls})$ and the symbol constellation map $\Omega$.

This invention delineates another procedure to map an M-dimensional symbol vector x to its neighboring symbol vector of the same dimension, denoted by $\bar{x}=P[x]$, that satisfies the following property: By using any combination of (M−1) elements of $\bar{x}$ as an (M−1)-dimensional seed symbol vector, the remaining 1-element of $\bar{x}$ is the corresponding seed complementary symbol vector. The symbol vector $\bar{x}$ that satisfies this property is termed a pivoting symbol vector. In other words, the pivoting symbol vector $\bar{x}$ is an augmented symbol vector generated by using any combination of (M−1) elements of $\bar{x}$ as an (M−1)-dimensional seed symbol vector. Note that this generation must hold true for all M possible combinations of selecting (M−1) elements out of $\bar{x}$ where the order of the (M−1) selected elements is irrelevant.

Figure 4:
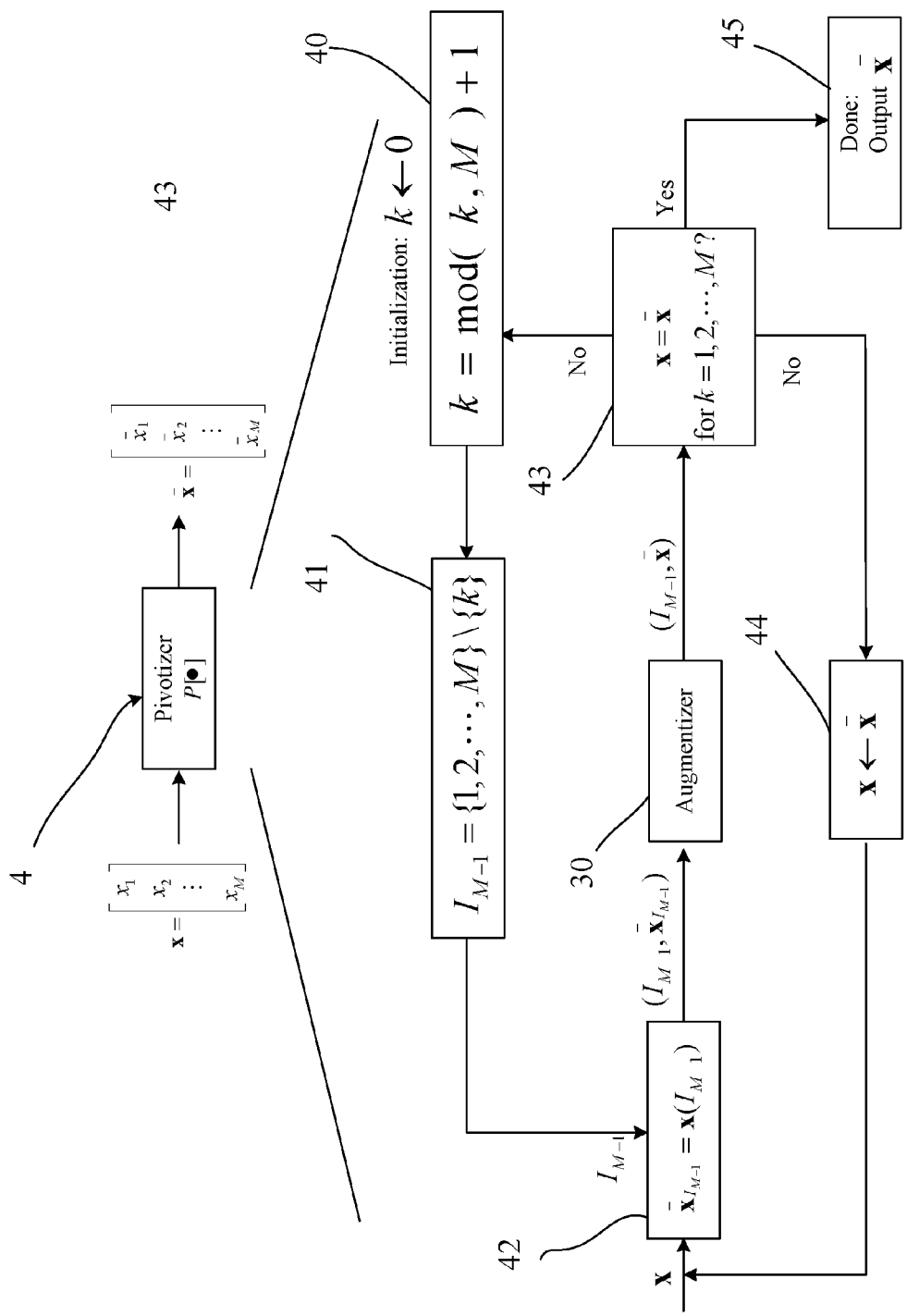
FIG. 4 illustrates the mapping of a symbol vector x to its neighboring symbol vector $\bar{x}$ confined to the pivoting property.

A systematic procedure illustrated in FIG. 4 is applied to map an arbitrarily given M-dimensional symbol vector x to its neighboring pivoting symbol vector $\bar{x}$. As shown in FIG. 4, this procedure is referred to as the pivoting procedure in the description of this invention and represented as a block termed the pivotizer 4. This pivoting procedure starts with a symbol vector x and an iteration variable k set to 0 as the initialization condition. In each iteration, the iteration variable k is modulo by M and increment by 1 40; the index set $I_{M-1}$ is selected as taking the index k out from the M indices {1, 2, . . . , M} 41 and is used to form $\bar{x}_{I_{M-1}}$ from x 42; the augmentizer 30 constructs $\bar{x}$ based on the input $(I_{M-1}, \bar{x}_{I_{M-1}})$; if this $\bar{x}$ equals x and the equality condition holds true for M consecutive iterations where k has looped through 1 to M 43, the procedure terminates with $\bar{x}$ found to be the neighboring pivoting symbol vector to the original x 45; otherwise, x is replaced by $\bar{x}$ 44 and another iteration starts with the iteration variable k modulo by M and increment by 1 40. It should be apparent to those skilled in the art that the above pivoting procedure is only illustration of specific embodiment of the pivotizer. Any modified pivoting procedures should fall in the scope of this invention provided that the outcome of the procedure is a symbol vector that satisfies the pivoting property as define in this invention. For example, the arrangement of selecting the index k out from the M indices {1, 2, . . . , M} from 1 to M in ascending order is shown in FIG. 4, whereas descending order or any other index selection order is also applicable provided that the index k is looped through the overall M indices.

Figure 5:
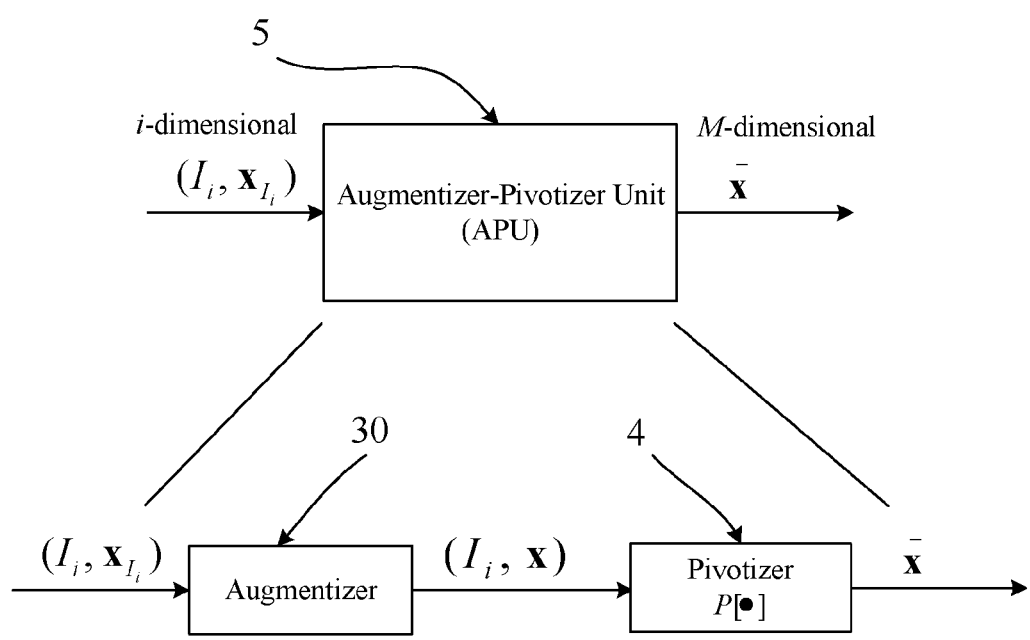
FIG. 5 illustrates the basic Augmentizer-Pivotizer Unit (APU)

As illustrated in FIG. 5, a computational unit is constructed by combining the augmentizer 30 and pivotizer 40 together and is referred to as the Augmentizer-Pivotizer Unit (APU) 5. This APU is used as the core computational unit in the embodiment of this invention to compute for the optimal maximum likelihood transmit symbols given the receiving samples at the receiver side.

Figure 6:
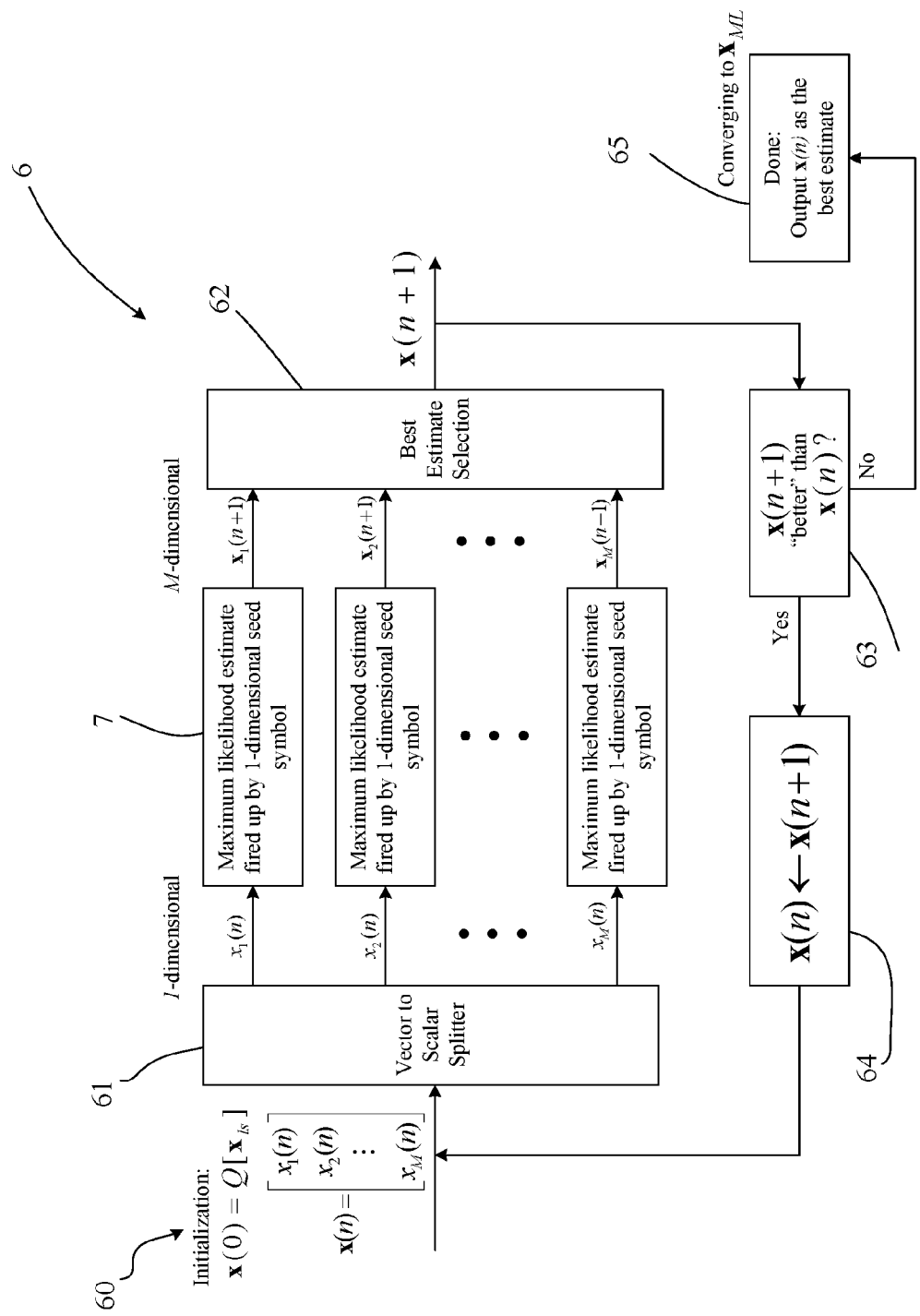
FIG. 6 illustrates an embodiment of the maximum likelihood symbol detector that has M branches with each branch consisting of a maximum likelihood estimation fired up by 1-dimensional seed symbol block.

As shown in FIG. 6, an embodiment of this invention employs M-branch of digital logic, which can be implemented as electronic circuit or computer program, to detect the maximum likelihood M-dimensional symbol vector, denoted by $x_{ML}$. Each branch is used to generate a sequence of symbol vector estimates such that the estimates from one or more of these branches converge to $x_{ML}$. To fire up the search procedure for the M-branch in FIG. 6, an initial estimate of $x_{ML}$ is required. A convenient way to generate this initial estimate x(0) is to compute the least-squares estimate and apply direct quantization on each element of the least-squares estimate to its nearest constellation point 60, i.e., $$x(0)=Q[x_{ls}]$$

Given H and y, the computation of this initial estimate is relatively simple and straightforward. Any other choices of initial estimate are also applicable to this search procedure in the embodiment of this invention.

Specifically, the maximum likelihood symbol detector 6 starts with x(n)=x(0) 60 and uses the vector-to-scalar splitter 61 to separate the M elements of x(n) into M branches where each branch is fired up with the corresponding element of x(n). For the m-th branch, the 1-dimensional symbol vector $x_m(n)$ is used to fire up the maximum likelihood estimate block 7 to generate the M-dimensional symbol vector $x_m(n+1)$. The Best Estimate Selection block 62 is then applied to select the "best" estimate out of $\{x_m(n+1), m=1, 2, \ldots, M\}$ from the M branches and the resulting best estimate is denoted by x(n+1). A symbol vector is deemed "better" than another symbol vector provided that the error (or objective) function, $\|H(x-x_{ls})\|_2^2$, associated with this symbol vector is smaller. The best estimate for this iteration, x(n+1), is compared to that for the last iteration, x(n) 63; if it is better, a better estimate has been found and x(n) is replaced by x(n+1) 64 to start another iteration of search; otherwise, the search procedure terminates with the "best" estimate output selected as x(n) 65.

Figure 7:
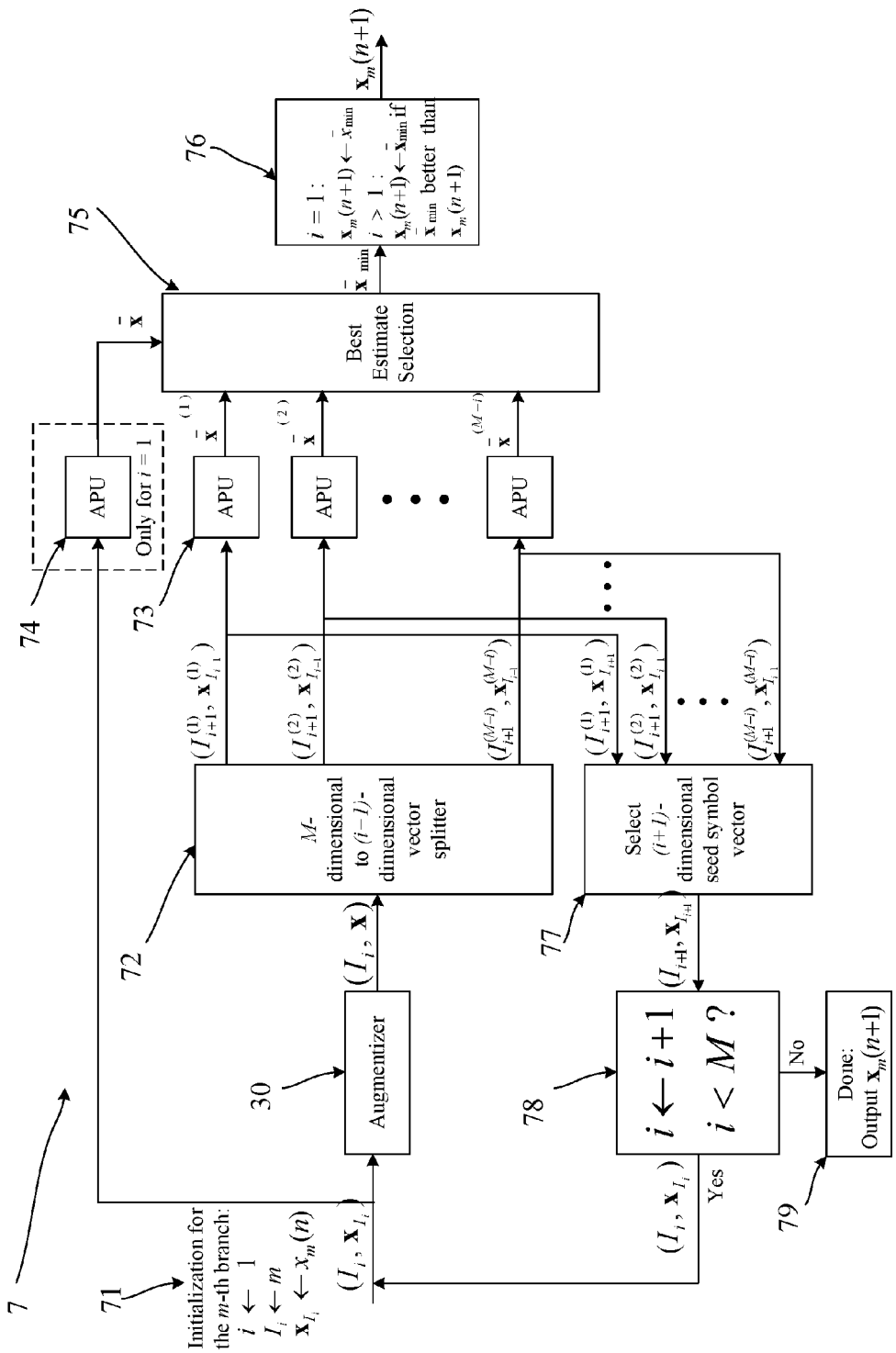
FIG. 7 illustrates an embodiment of the maximum likelihood estimation fired up by 1-dimensional seed symbol block for the m-th branch of the maximum likelihood symbol detector.

In an embodiment of this invention, the "maximum likelihood estimate fired up by 1-dimensional seed symbol vector" block 7 for the m-th branch in FIG. 6 is implemented as illustrated in FIG. 7. For one particular iteration n in the m-th branch, the maximum likelihood estimation block 7 in FIG. 7 starts with initializing i as 1 and the 1-dimensional seed symbol vector as $(I_i, x_{I_i}) \leftarrow (m, x_m(n))$ 71; the augmentizer 30 generates the M-dimensional augmented symbol vector x; an M-dimensional to (i+1)-dimensional vector splitter 72 is then applied to map x into (M−i) pairs of (i+1)-dimensional seed symbol vectors $(I_{i+1}^{(l)}, x_{I_{i+1}}^{(l)})$ defined as:

$$I_{i+1}^{(l)} = \{I_i, I_{M-i}(l)\}, \text{ and } x_{I_{i+1}}^{(l)} \begin{bmatrix} x_{I_i} \\ x_{I_{m-i}}(l) \end{bmatrix}$$

for l=1, 2, . . . , M−i; each one of these $(I_{i+1}^{(l)}, x_{I_{i+1}}^{(l)})$ is fed into an APU 73 to compute for a pivoting symbol vector $\bar{x}^{(l)}$, respectively; for i=1, the i-th dimensional seed vector $(I_i, x_{I_i})$ is also fed into an APU 74 to compute for a pivoting symbol vector $\bar{x}$; the Best Estimate Selection block 75 then selects the best estimate from these pivoting symbol vectors and the output is denoted as $\bar{x}_{min}$; for i=1, the output for this branch is temporarily assigned as: $x_m(n+1) \leftarrow \bar{x}_{min}$ 76; as i progresses from 1 to M−1, $\bar{x}_{min}$ is compared with the $x_m(n+1)$ computed for (i−1) and $x_m(n+1)$ for i is updated as $\bar{x}_{min}$ if $\bar{x}_{min}$ is better than $x_m(n+1)$ 76; the "Select (i+1)-dimensional seed symbol vector" block 77 is used to select one out of the (M−i) (i+1)-dimensional seed symbol vectors where a minimum error criterion is used to make the selection, i.e., the corresponding linearly constrained minimization subproblem for $(I_{i+1}^{(l)}, x_{I_{i+1}}^{(l)})$ that yields the minimum error is selected as $(I_{i+1}, x_{I_{i+1}})$; this seed symbol vector $(I_{i+1}, x_{I_{i+1}})$ is then used as the input to the augmentizer 30 in FIG. 7 to start the next loop of estimation procedure by increment i by 1 until i reaches M 78; when i reaches M the output for this branch in this iteration is generated as $x_m(n+1)$ 79.

Having described one embodiment of this invention, there are various modifications that can be made without departing from the scope of the invention. Several modification schemes that are applicable for deriving additional embodiments of this invention are provided below.

Figure 8:
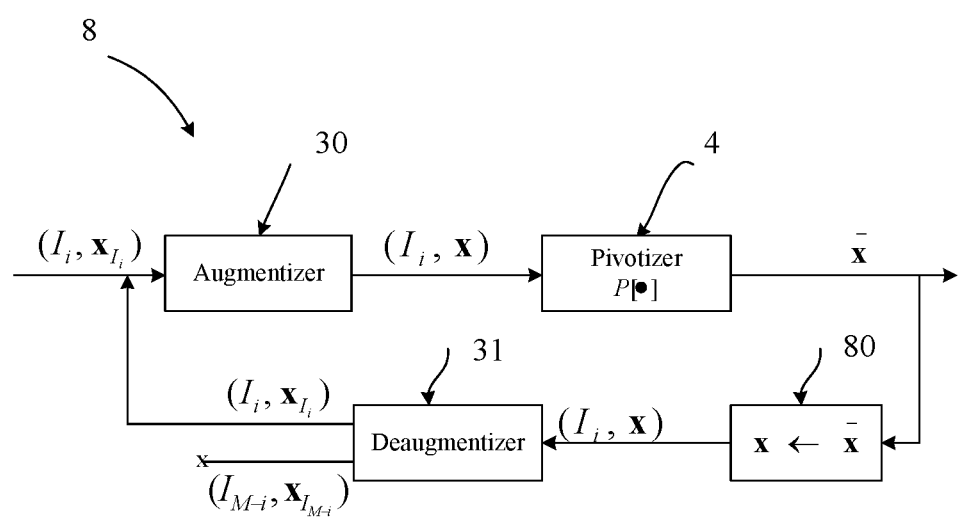
FIG. 8 illustrates the APU with feedback.
Figure 9:
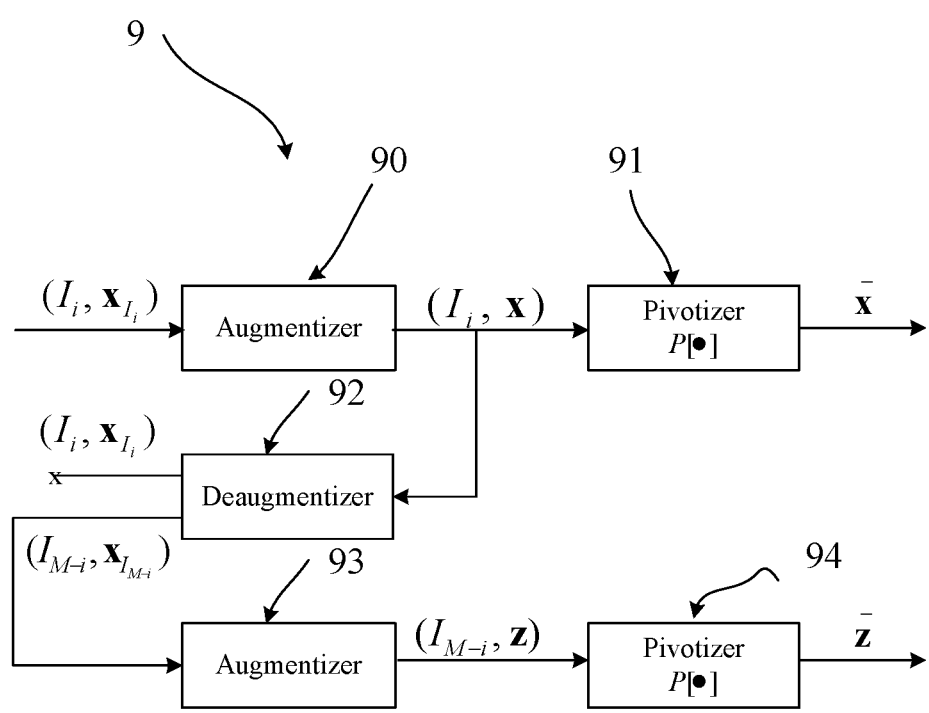
FIG. 9 illustrates the APU with seed duality.

1) The APU 5 as shown in FIG. 5 is used to compute a pivoting symbol vector from an i-dimensional seed symbol vector with an augmentizer 30 and a pivotizer 4. Extensions of this basic APU 5 can be derived by use of feedback as shown in FIG. 8 and seed duality as shown in FIG. 9, respectively. The APU with feedback 8 in FIG. 8 takes the pivoting symbol vector output 80 and deaugmentizes 31 it to an i-dimensional seed symbol vector to recompute a new pivoting symbol vector 30, 4. This feedback can continue for a finite number of times or until the process converges, i.e., when two consecutive output pivoting symbol vectors are equal. The best pivoting symbol vector generated through this feedback process can be used as the final output of the APU. On the other hand, the APU with seed duality 9 in FIG. 9 generates one pivoting symbol vector $\bar{x}$ by use of the i-dimensional seed symbol vector as in the basic APU 90, 91 and an additional pivoting symbol vector $\bar{z}$ by use of the (M−i)-dimensional seed complementary symbol vector 92, 93, 94. More types of APU can also be derived by the mixture of using the mechanism of feedback and seed duality or any other applicable mechanism. Any type of APU that can generate one or more pivoting symbol vectors from an i-dimensional seed symbol vector can be adopted to derive additional embodiments of this invention.

2) For each iteration n in the embodiment of FIG. 6, the embodiment has M branches corresponding to m=1, 2, . . . , M. In addition, for the embodiment of each of these M branches in FIG. 7, there are M−1 loopback levels corresponding to i=1, 2, . . . , M−1. A sequence of pivoting symbol vectors is generated during one iteration n for the two variable loops specified by m and i. When a better pivoting symbol vector is encountered in any particular (m, i) loop, the iteration n can be terminated prematurely, without having to reach all possible (m, i) loops, by using this pivoting symbol vector as the better estimate for this iteration and proceed to the next iteration n+1. This iteration premature termination strategy can be adopted to derive additional embodiments of this invention.

3) For each iteration n in the embodiment of FIG. 6, the embodiment has M branches corresponding to m=1, 2, . . . , M. In addition, for the embodiment of each of these M branches in FIG. 7, there are M−1 loopback levels corresponding to i=1, 2, . . . , M−1. Over all the loops specified by the three variables (n, m, i), any two identical i-dimensional seed symbol vectors ($I_i$, $x_{I_i}$) to the input of the augmentizer 30 in FIG. 7 generate the same pivoting symbol vectors at the output of the Best Estimate Selection 75 and hence all repetition of i-dimensional seed symbol vectors over (n, m, loops at the input of the augmentizer 30 can be avoided to save computation resource without performance degradation. A simple store-and-compare mechanism to keep track of all i-dimensional seed symbol vectors appearing at the input of the augmentizer 30 in FIG. 7 can be adopted to derive additional embodiments of this invention.

4) In the embodiment of FIG. 7, the "Select (i+1)-dimensional seed symbol vector" block 77 is used to select one out of (M−i) seed symbol vectors to pass onto the next loopback level of i+1. This block 77 can be modified to allow the selection of more than one seed symbol vectors to pass onto the next loopback level at the cost of more computational complexity. By properly buffering the output of this block 77, the selection of more than one (i+1)-dimensional seed symbol vectors can be implemented and adopted to derive additional embodiments of this invention. In addition, besides the described minimum error selection criterion, other selection criterion can also be adopted to derive additional embodiments of this invention.

5) In the embodiment of FIG. 7, there are (M−i) (i+1)-dimensional seed symbol vectors ($I_{i+1}^{(l)}$, $x_{I_{i+1}}^{(l)}$) that are generated at the output of the "M-dimensional to (i+1)-dimensional vector splitter" block 72 and are fed into (M−i) APUs 73 to generate (M−i) pivoting symbol vectors $\bar{x}^{(l)}$. By selecting only a subset of these (M−i) (i+1)-dimensional seed symbol vectors to be fed into the APUs, the computational complexity can be reduced. This computational complexity reduction strategy with a proper subset selection criterion can be adopted to derive additional embodiments of this invention.

The present invention has been described with specific embodiments above. However, it should be apparent to those skilled in the art that the above description is only illustration of specific embodiments and examples of the present invention. The present invention should therefor cover various modifications and variations made to the herein-described architecture and operations of the present invention, provided they fall within the scope of the present invention as defined in the following appended claims.

What is claimed is:

1. A method for detecting transmit symbols at a receiver side in a communications system, comprising:
   obtaining a channel state information matrix H and a received vector y, so to have a relation that the received vector y is equal to the matrix H multiplied by a transmit symbol vector x, which carries unknown noise n, as y=Hx+n;
   setting a constraint matrix C, wherein the constraint matrix C is an arbitrary unitary matrix and constrained values f are specified as differences between the transmit symbol vector x and a least-squares (ls) solution $x_{ls}$, a relation of f=x−$x_{ls}$, wherein the transmit symbol vector x is iteratively sought by successively exchanging linear constraints through selected constraints of a reduced set of i linear constraints from a full set of M constraints, where i<M, and an assignment of the proper constraint values to the selected constraints in each iteration, wherein M is an integer greater than 1 and is equal to a number of antennas or a number of the transmit symbols being detected in one time instant in the communications system, wherein a transverse matrix $C^T$ multiplied by a variable vector w is equal to the constrained values f as a product of $C^T$ w=f;
   partitioning the transmit symbol vector x as M-dimensional into an i-dimensional seed symbol vector and a corresponding (M−i)-dimensional seed complementary symbol vector, wherein the seed symbol vector is inherited from an estimate in a previous (i−1)-th iteration and the corresponding seed complementary symbol vector is to be generated in a current i-th iteration;
   in each iteration, forming a new estimate of a M-dimensional augmented symbol vector from a concatenation of the i-dimensional seed symbol vector and the (M−i)-dimensional seed complementary symbol vector, and a matrix A equal to a product of H and $C^T$ as A=H$C^T$ is multiplied by the variable vector w to have a product of Aw and a minimum of an absolutes square of the product of Aw as $$\min_w \|Aw\|^2$$

to determine the variable vector w as solved; and
   calculating the constrained values f by the product of $C^T$ w=f; and obtaining the symbol vector x, based on the relation of f=x−$x_{ls}$.

2. The method of claim 1, wherein a number of a full set linear constraints equals a number of antennas or a number of the transmit symbols being detected in one time instant, denoted by M.

3. The method of claim 1, wherein in each iteration a search procedure is carried out to solve for a new estimate for the transmit symbol vector x by a core computational circuit, and an augmentizer-pivotizer circuit, further comprising:
   an augmentizer processing circuit comprising:
      a first sub-circuit configured to find a solution of a linearly-constrained minimization subproblem with reduced constraint sets given the i-dimensional seed symbol vector from a previous iteration,
      a second sub-circuit configured to quantize a subproblem solution to a nearest constellation point and a third sub-circuit to concatenate the i-dimensional seed symbol vector and the corresponding (M−i)-dimensional seed complementary symbol vector to form the M-dimensional augmented symbol vector, and
      a pivotizer circuit configured to map the M-dimensional augmented symbol vector from the augmentizer output to a neighboring pivoting symbol vector $\bar{x}$ of the same dimension,
      wherein the $\bar{x}$ satisfies a pivoting property: by using any combination of (M−1) elements of the $\bar{x}$ as an (M−1)-dimensional seed symbol vector, the remaining 1-element of the $\bar{x}$ is the corresponding seed complementary symbol vector.

4. The method of claim 3, wherein the pivotizer circuit of the augmentizer-pivotizer circuit is implemented with a pivoting procedure starting with a symbol vector x and an iteration variable k set to 0 as an initialization condition,
   wherein in each iteration, the iteration variable k is modulo by M and increment by 1;
   an index set $I_{M-1}$ is selected as taking the index k out from the M indices {1, 2, ..., M} and is used to form $\bar{x}_{I_{M-1}}$ from x;
   an augmentizer constructs the $\bar{x}$ based on an input ($I_{M-1}$, $\bar{x}_{I_{M-1}}$); if the $\bar{x}$ equals x and an equality condition holds true for M consecutive iterations where the index k has looped through I to M, the procedure terminates with $\bar{x}$ found to be the neighboring pivoting symbol vector to an original x;
   otherwise, the original x is replaced by $\bar{x}$ and a next iteration starts with the index k of iteration modulo by M and increment by 1.

5. The method of claim 3, wherein the augmentizer-pivotizer circuit is further allowing use of a feedback process, by taking the pivoting symbol vector output and deaugmentizing to the i-dimensional seed symbol vector to re-compute a new pivoting symbol vector, and wherein the feedback process continues for a finite number of times or until a process converges, when two consecutive output pivoting symbol vectors are equal, a determined pivoting symbol vector generated through the feedback process is used as a final output of the augmentizer-pivotizer circuit.

6. The method of claim 3, wherein the augmentizer-pivotizer circuit is further allowing use of a seed duality, by generating one pivoting symbol vector by use of the i-dimensional seed symbol vector as in the augmentizer-pivotizer circuit and an additional pivoting symbol vector by use of the (M−i)-dimensional seed complementary symbol vector.

7. The method of claim 3, wherein the augmentizer-pivotizer circuit is further allowing use of a mixture of feedback and seed duality or any type of augmentizer-pivotizer circuit to generate one or more pivoting symbol vectors from the i-dimensional seed symbol vector.

8. An apparatus for detecting transmit symbols at a receiver side in a communications system, comprising:
   a vector to scalar splitter,
   M branches of maximum likelihood estimators, M is integer greater than 1
   a best estimate selector,
   a better estimate comparator, and
   a logic decision circuit,
   wherein the vector to scalar splitter converts a current M-dimensional maximum likelihood symbol vector estimate into M 1-dimensional seed symbols,
   wherein each of the M branches of maximum likelihood estimators is fired up by one of the M 1-dimensional seed symbols from an output of the vector to scalar splitter, respectively,
   wherein the best estimate selector selects a best maximum likelihood estimate from an output of the M branches of maximum likelihood estimators,
   wherein the better estimate comparator compares an output of the best estimate selector with a last best estimate and picks a better estimate
   wherein when a new better estimate is found from the better estimate comparator, the logic decision circuit triggers a start of a next iteration with the estimate being fed into the vector to scalar splitter, otherwise, the logic decision circuit triggers a stop of the apparatus and outputs the estimate as a maximum likelihood estimate for a transmit symbol vector.

9. The apparatus of claim 8, wherein the logic decision circuit is further allowing a trigger of the next iteration whenever a better pivoting symbol vector is encountered, by using the pivoting symbol vector as the better estimate for the iteration n and proceeding to the next iteration (n+1).

10. The maximum likelihood estimator of claim 8, wherein the maximum likelihood estimator is implemented in an electronic circuit.

11. A maximum likelihood estimator fired up by an 1-dimensional seed symbol comprising:
   a counter to count a variable i from 1 to M, M is integer greater than 1,
   an augementizer to take an 1-dimensional seed vector as an input and to output an M-dimensional augmented symbol vector,
   an M-dimensional to (i+1)-dimensional vector splitter to take an M-dimensional symbol vector as an input and to output (M−i) (i+1)-dimensional seed symbol vectors,
   an (i+1)-dimensional seed symbol selector to select one out of the (M−i) (i+1)-dimensional seed symbol vectors, (M−i) augmentizer-pivotizer circuits and one extra augmentizer-pivotizer circuit when i=1,
   a best estimate selector to select one out of (M−i) M-dimensional symbol vectors when i>1 and i<M, or to select one out of the M-dimensional symbol vector for i=1,
   a comparator to compare the output of the best estimate selector with a last best estimate and to pick a better estimate.

12. The maximum likelihood estimator of claim 11, wherein a search procedure is further allowing use of a store-and-compare mechanism to keep track of all the i-dimensional seed symbol vectors appearing at the input of the augmentizer and remove any repetitively occurring one of the seed symbol vectors to avoid repetition.

13. The maximum likelihood estimator of claim 11, wherein a search procedure is further allowing use of a buffering scheme to select more than one (i+1)-dimensional seed symbol vectors to pass onto a next loopback level of (i+1).

14. The maximum likelihood estimator of claim 11, wherein a search procedure is further allowing use of a subset selection criterion, by selecting only a subset of the (M−i) (i+1)-dimensional seed symbol vectors to be fed into the augmentizer-pivotizer circuits.

* * * * *